(12) United States Patent
Kim

(10) Patent No.: US 11,046,364 B2
(45) Date of Patent: Jun. 29, 2021

(54) FRONT SUPPORT FOR VEHICLE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 12 days.

(21) Appl. No.: 16/516,561

(22) Filed: Jul. 19, 2019

(65) Prior Publication Data
US 2020/0324820 A1 Oct. 15, 2020

(30) Foreign Application Priority Data
Apr. 10, 2019 (KR) .................. 10-2019-0041804

(51) Int. Cl.
*B62D 21/15* (2006.01)
*B62D 25/08* (2006.01)

(52) U.S. Cl.
CPC .......... *B62D 21/152* (2013.01); *B62D 25/08* (2013.01)

(58) Field of Classification Search
CPC ..... B62D 21/152; B62D 25/08; B62D 21/155
USPC ............... 296/193.09, 193.1, 187.04, 203.02
See application file for complete search history.

(56) References Cited

U.S. PATENT DOCUMENTS

| 4,702,515 | A   | * | 10/1987 | Kato ................... | B62D 21/152 188/377 |
| 8,403,403 | B2  | * | 3/2013  | Tashiro .................. | B60R 21/34 296/187.09 |
| 9,539,968 | B2  | * | 1/2017  | Nishida ................ | B62D 25/082 |
| 2005/0067860 | A1 | * | 3/2005 | Makita .................... | B60R 19/24 296/203.02 |
| 2010/0259033 | A1 | * | 10/2010 | Okabe ................ | B60R 21/0136 280/734 |
| 2013/0119682 | A1 | * | 5/2013  | Matuschek ............ | B60R 19/34 293/133 |
| 2015/0274211 | A1 | * | 10/2015 | Riedl ................... | B62D 25/084 296/187.09 |
| 2016/0244014 | A1 | * | 8/2016  | Ihori .................... | B62D 25/084 |

FOREIGN PATENT DOCUMENTS

KR 10-1691110 B1 1/2017

* cited by examiner

*Primary Examiner* — Joseph D. Pape
(74) *Attorney, Agent, or Firm* — Morgan, Lewis & Bockius LLP

(57) ABSTRACT

A front support apparatus for a vehicle may include an upper back beam mounted at a front of the vehicle, extending in a width direction of the vehicle, and connected to front end portions of a pair of fender aprons positioned at the front of the vehicle; a middle back beam mounted below the upper back beam, extending in the width direction of the vehicle, and connected to front end portions of a pair of front side members extending to the front of the vehicle; and a lower back beam mounted below the middle back beam, extending in the width direction of the vehicle, and connected to a front portion of a front sub-frame mounted below the vehicle.

14 Claims, 7 Drawing Sheets

FRONT SUPPORT FOR VEHICLE

CROSS REFERENCE TO RELATED APPLICATION

The present application claims priority to Korean Patent Application No. 10-2019-0041804, filed Apr. 10, 2019, the entire contents of which is incorporated herein for all purposes by this reference.

BACKGROUND OF THE INVENTION

Field of the Invention

The present invention relates to a front support apparatus for a vehicle which is capable of absorbing an external impact through three back beams mounted at a front of a vehicle in a vehicle front body structure.

Description of Related Art

In general, a vehicle front body structure is positioned at a front of a vehicle and is subjected to a collision load first to relieve the impact when a vehicle collides in a forward direction thereof. Thus, the vehicle front body structure performs functions of forming an engine compartment of a vehicle and protecting occupants from a forward collision.

The impact applied to the front of a vehicle due to the forward collision is delivered to a front side member through a front back beam of a vehicle body. The front side member is buckled to absorb a certain amount of impact, and then the remaining impact is delivered to the vehicle body through the front side member.

Meanwhile, a next generation vehicle such as an electronic vehicle tends to expand an internal space thereof, such that a space of the engine compartment is designed to be relatively smaller than a conventional vehicle. As a result, as a length of the front side member to absorb an amount of impact becomes shorter at the time of the forward collision of a vehicle, a large amount of impact is delivered to the vehicle body and the internal space is pressed, which leads to a high possibility for occupants to be injured.

Accordingly, a new vehicle front body structure configured for sufficiently absorbing an amount of impact is required even when the engine compartment becomes smaller.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front support apparatus for a vehicle which is configured for absorbing an external impact through three back beams mounted at a front side of a vehicle in a vehicle front body structure.

According to an exemplary embodiment of the present invention, a front support apparatus for a vehicle may include: an upper back beam mounted at a front of the vehicle, extending in a width direction of the vehicle, and connected to front end portions of a pair of fender aprons positioned at the front of the vehicle; a middle back beam mounted below the upper back beam, extending in the width direction of the vehicle, and connected to front end portions of a pair of front side members extending to the front of the vehicle; and a lower back beam mounted below the middle back beam, extending in the width direction of the vehicle, and connected to a front portion of a front sub-frame mounted below the vehicle.

A pair of first support portions each extending forward of the vehicle may be formed at front end portions of the pair of fender aprons, and a left rear end portion and a right rear end portion of the upper back beam may be connected to each of the front end portions of the pair of first support portions.

Each of the pair of first support portions may have an upper surface, a lower surface, and a pair of side surfaces connecting the upper and lower surfaces to each other and formed into a hollow closed section structure, and a plurality of beads may be vertically formed on the side surfaces of the pair of first support portions and spaced from each other in a longitudinal direction thereof.

The front end portions of the pair of fender aprons may have cross-sectional areas wider than cross-sectional areas of rear surface portions of the pair of first support portions.

A pair of second support portions each extending forward of the vehicle may be formed at front end portions of the pair of front side members, and a left rear end portion and a right rear end portion of the middle back beam may be connected to each of the front end portions of the pair of second support portions.

Each of the pair of second support portions may have an upper surface, a lower surface, and a pair of side surfaces connecting the upper and lower surfaces to each other and formed into a hollow closed section structure, and a plurality of beads may be vertically formed on the side surfaces of the pair of second support portions and spaced from each other in a longitudinal direction thereof.

A pair of third support portions each extending forward of the vehicle may be formed at the front end portion of the front sub-frame of the vehicle, and a left rear end portion and a right rear end portion of the lower back beam may be connected to each of the front end portions of the pair of third support portions.

Rear end portions of the pair of third support portions may be connected to a point where a front mount connected to a vehicle body in the front end portion of the front sub-frame is formed.

Each of the pair of third support portions may have an upper surface, a lower surface, and a pair of side surfaces connecting the upper and lower surfaces to each other, and a plurality of beads may be vertically formed on the side surfaces of the pair of third support portions and spaced from each other in a longitudinal direction thereof.

The side surfaces of the pair of third support portions may connect the upper and lower surfaces to each other at internal end portions of the pair of the third support portions toward an internal to the vehicle, and external end portions of the pair of the third support portions may be formed in an open shape.

The upper back beam and the middle back beam may be mounted in parallel on a same imaginary vertical line with respect to a longitudinal direction of the vehicle.

The middle back beam and the lower back beam may be mounted in parallel on a same imaginary vertical line with respect to a longitudinal direction of the vehicle.

The front support apparatus for a vehicle may further include: a first connection portion mounted between the upper back beam and the middle back beam, extending in a vertical direction of the vehicle and having an upper portion connected to the upper back beam and a lower portion connected to the middle back beam.

The front support apparatus for a vehicle may further include: a second connection portion mounted between the middle back beam and the lower back beam, extending in the vertical direction of the vehicle and having the upper portion connected to the middle back beam and the lower portion connected to the lower back beam.

The front support apparatus for a vehicle may further include: a second connection portion mounted between the middle back beam and the lower back beam, extending in the vertical direction of the vehicle and having the upper portion connected to the middle back beam and the lower portion connected to the lower back beam, wherein each of the lower end portion of the first connection portion and the upper end portion of the second connection portion may be connected to a center portion of the middle back beam.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
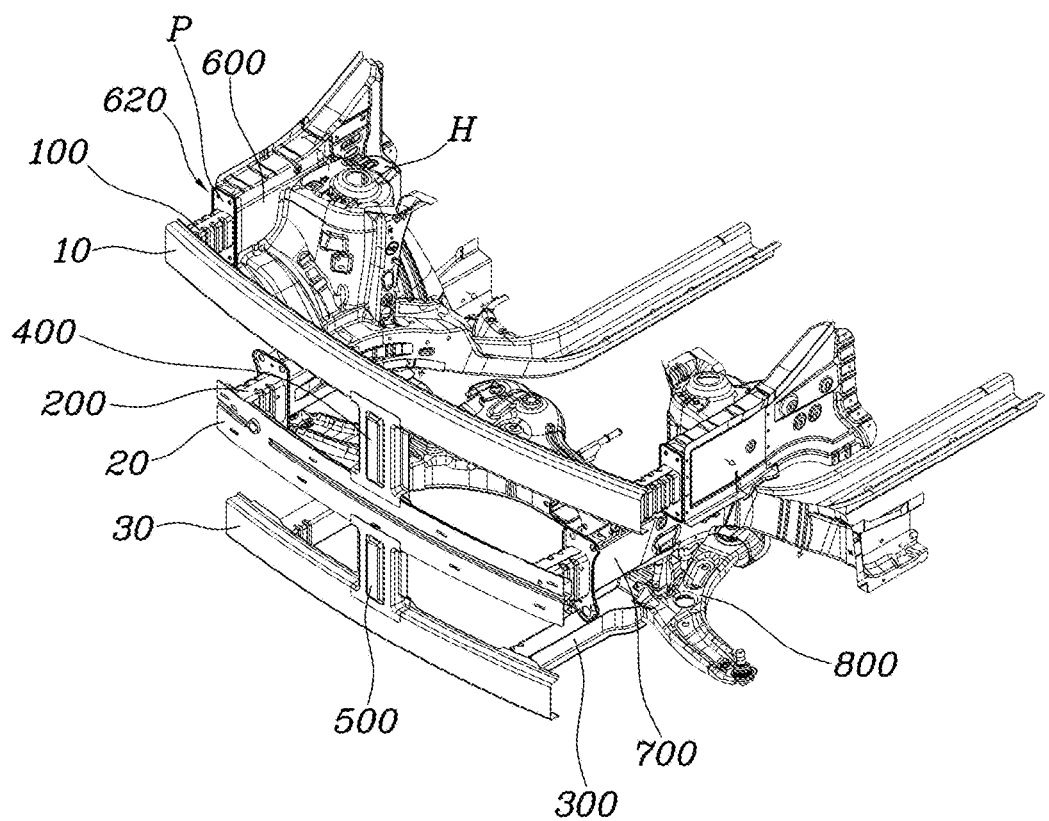
FIG. 1 is a view showing a front support apparatus for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a front support apparatus for a vehicle according to exemplary embodiments of the present invention is described with reference to the accompanying drawings.

Figure 2:
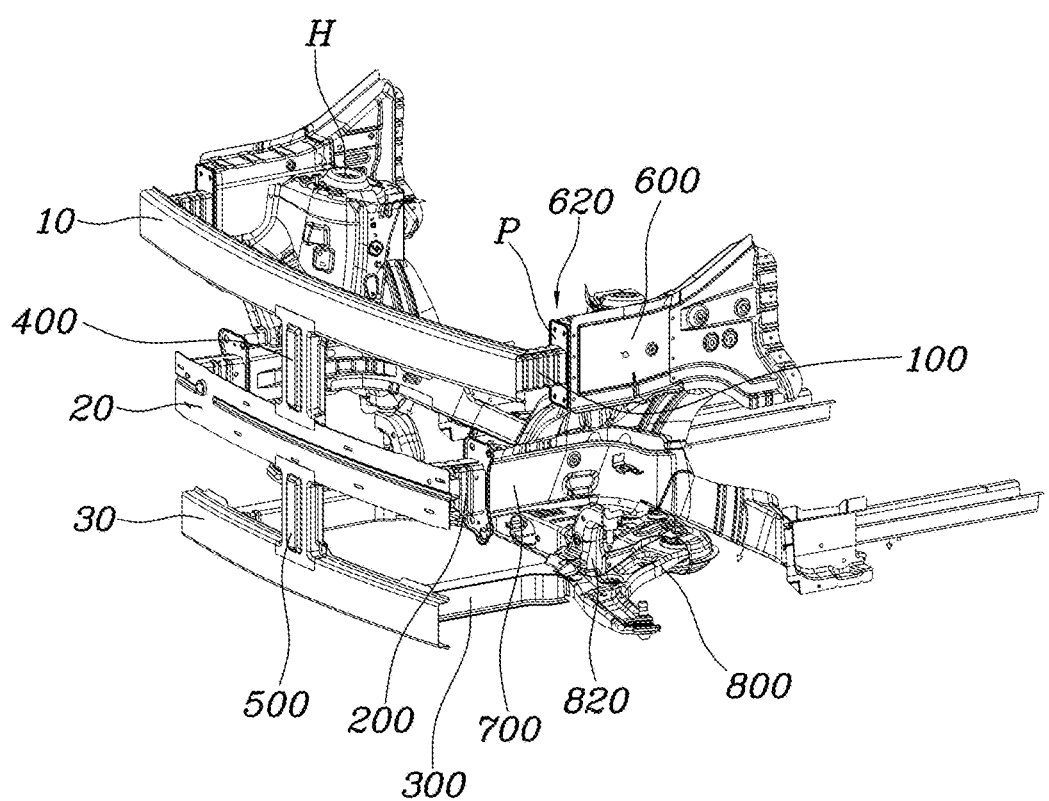
FIG. 2 is a perspective view showing a front support apparatus for a vehicle according to an exemplary embodiment of the present invention.
Figure 3:
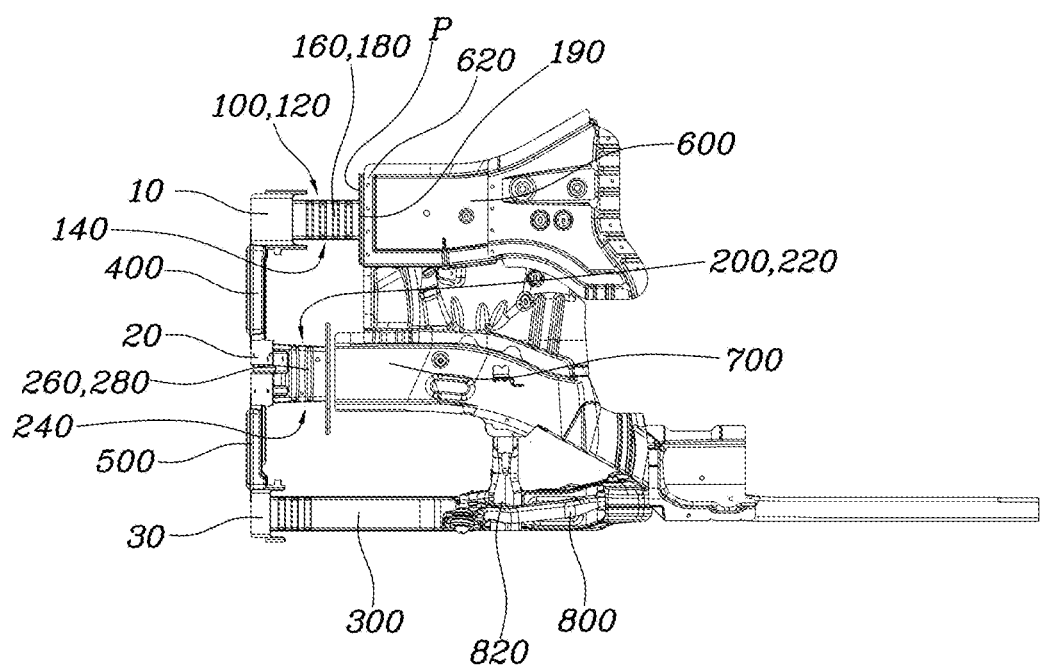
FIG. 3 is a side view showing a front support apparatus for a vehicle according to an exemplary embodiment of the present invention.
Figure 4:
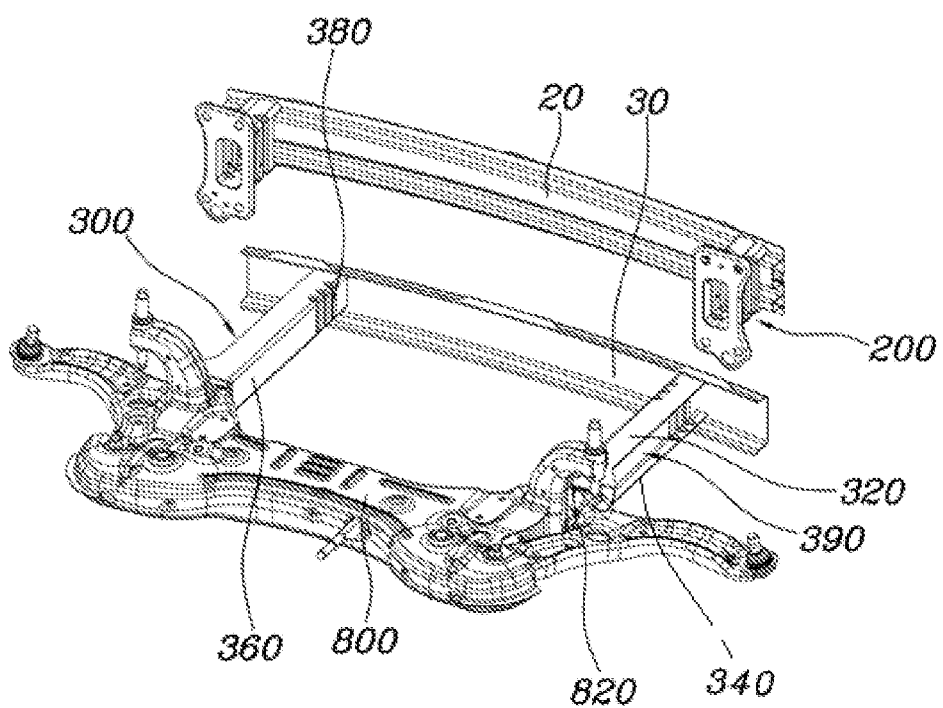
FIG. 4 is a view showing a middle back beam and a lower back beam of a front support apparatus for a vehicle according to an exemplary embodiment of the present invention.
Figure 5:
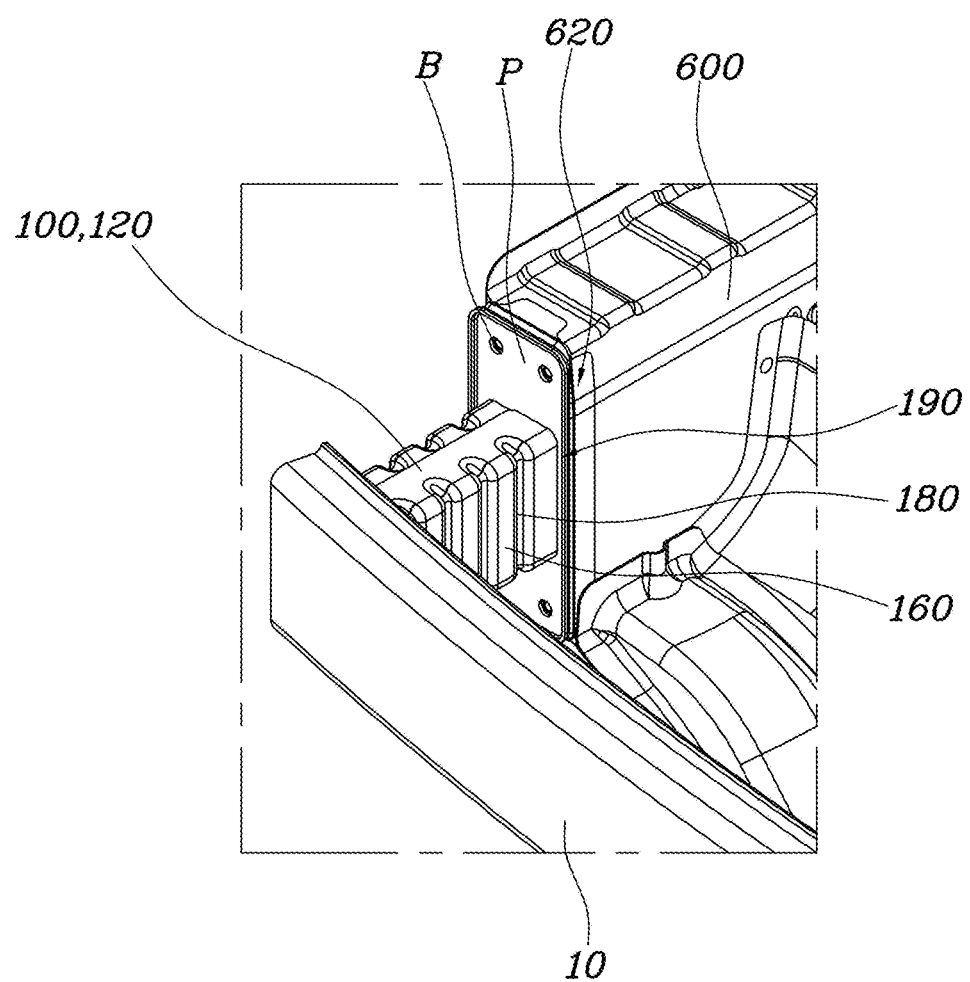
FIG. 5 is a view showing an upper back beam and a first support portion of a front support apparatus for a vehicle according to an exemplary embodiment of the present invention.
Figure 6:
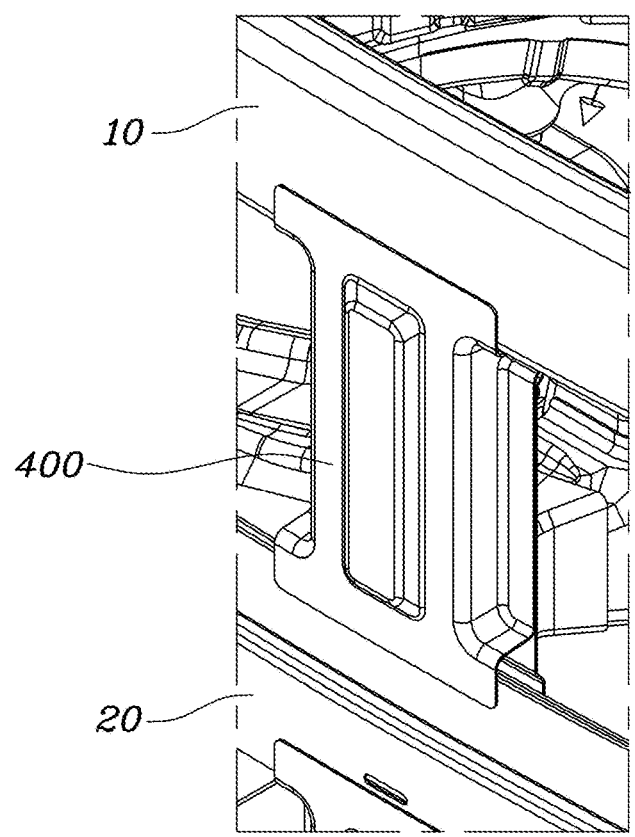
FIG. 6 is a view showing a first connection portion of a front support apparatus for a vehicle according to an exemplary embodiment of the present invention.
Figure 7:
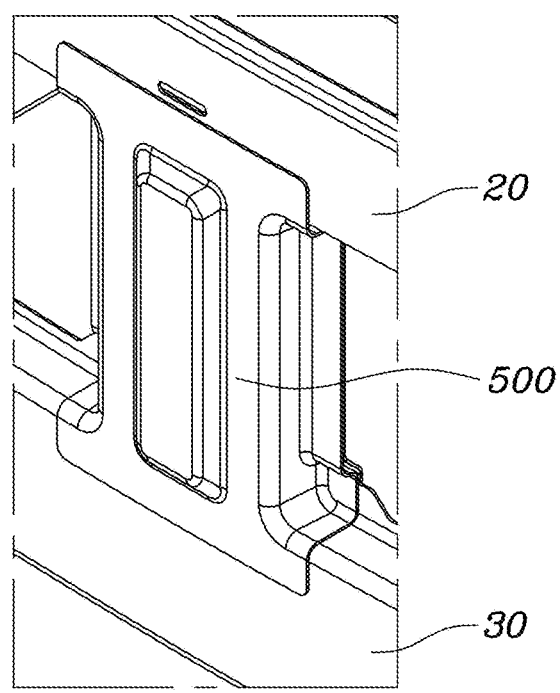
FIG. 7 is a view showing a second connection portion of a front support apparatus for a vehicle according to an exemplary embodiment of the present invention.

FIG. 1 is a view showing a front support apparatus for a vehicle according to an exemplary embodiment of the present invention, FIG. 2 is a perspective view showing a front support apparatus for a vehicle according to an exemplary embodiment of the present invention, FIG. 3 is a side view showing a front support apparatus for a vehicle according to an exemplary embodiment of the present invention, FIG. 4 is a view showing a middle back beam and a lower back beam of a front support apparatus for a vehicle according to an exemplary embodiment of the present invention, FIG. 5 is a view showing an upper back beam and a first support portion of a front support apparatus for a vehicle according to an exemplary embodiment of the present invention, FIG. 6 is a view showing a first connection portion of a front support apparatus for a vehicle according to an exemplary embodiment of the present invention, and FIG. 7 is a view showing a second connection portion of a front support apparatus for a vehicle according to an exemplary embodiment of the present invention.

Recently, a next generation vehicle such as an electronic vehicle tends to reduce a space of an engine compartment and expand an internal space of a vehicle. Accordingly, since a vehicle body with a short overhang is used for reducing the space of the engine compartment, a length of the front side member in a vehicle body becomes shorter. However, in the instant case, the front side member may not sufficiently absorb an amount of impact at the time of forward collision of a vehicle. As a result, a large amount of impact is delivered from the vehicle front body to the internal space of a vehicle, which leads to a high possibility for occupants to be injured.

To solve the problem described above, as shown in FIG. 1 and FIG. 2, a front support apparatus for a vehicle according to an exemplary embodiment of the present invention may include: an upper back beam 10 mounted at a front of a vehicle, extending in a width direction of a vehicle, and connected to front end portions of a pair of fender aprons 600 positioned at the front of a vehicle; a middle back beam 20 mounted below the upper back beam 10, extending in the width direction of a vehicle, and connected to front end portions of a pair of front side members 700 extending to the front of a vehicle; and a lower back beam 30 mounted below the middle back beam 20, extending in the width direction of a vehicle, and connected to a front portion of a front sub-frame 800 mounted below a vehicle.

As shown in FIG. 1, the upper back beam 10 connected to the front portion of the pair of fender aprons 600 is provided in the front support apparatus for a vehicle of the present invention. In the front support apparatus for a vehicle, the pair of fender aprons 600 are coupled to sides of shock absorber housings H, respectively. The upper back beam 10 is buckled at the time of the forward collision of a vehicle to absorb an impact first, and the remaining impact is delivered to the vehicle body through the pair of fender aprons 600. In an exemplary embodiment of the present invention, the middle back beam 20 is mounted below the upper back beam 10 and connected to the front end portions of the pair of front side members 700. The middle back beam 20 is buckled at the time of the forward collision of a vehicle to absorb an impact first, and the remaining impact is delivered to the vehicle body through the pair of front side members 700. In an exemplary embodiment of the present invention, the lower back beam 30 is mounted below the middle back beam 20 and connected to the front portion of the front sub-frame 800. The lower back beam 30 is buckled at the time of the forward collision of a vehicle to absorb an impact first, and the remaining impact is delivered to a vehicle body through the front sub-frame 800. As described above in an exemplary embodiment of the present invention, the impact is absorbed first through three back beams (the upper back beam 10, the middle back beam 20, and the lower back beam 30). Thus, although the engine compartment tends to be smaller, the amount of impact is sufficiently absorbed to the three back beams to protect the engine compartment. Furthermore, the remaining amount of impact is delivered to a vehicle body after the three back beams 10, 20, and 30 absorb the impact at the time of the forward collision of a vehicle, such that an amount of impact delivered to the internal space of a vehicle is relieved and safety of occupants are improved, which is advantageous.

Meanwhile, as shown in FIG. 1, FIG. 2, and FIG. 3, in the front support apparatus for a vehicle of the present invention, a pair of first support portions 100 each extending forward of a vehicle may be formed at front end portions 620 of the pair of fender aprons 600, and a left rear end portion and a right rear end portion of the upper back beam 10 may be connected to each of the front end portions of the pair of first support portions 100. Recently, in consideration of the tendency that a length of the front side member becomes shorter using a vehicle body with a short overhang, there is a possibility that the front side member cannot sufficiently absorb the impact at the time of the forward collision of a vehicle. Accordingly, to solve the problem, in an exemplary embodiment of the present invention, the impact of the forward collision may be further absorbed through the pair of first support portions 100 connected to the upper back beam 10.

In detail, each of the pair of first support portions 100 may have an upper surface 120, a lower surface 140, and a pair of side surfaces 160 connecting the upper and lower surfaces 120 and 140 to each other and formed into a hollow closed section structure. A plurality of beads 180 are vertically formed on the side surfaces 160 of the pair of first support portions 100 and spaced from each other in a longitudinal direction thereof. In the pair of first support portions 100 described above form load paths at the time of the forward collision of a vehicle to perform a function of delivering a load applied through the upper back beam 10 to the pair of fender aprons 600. Furthermore, the pair of first support portions 100 are formed into the hollow closed section structure whereby the impact due to the forward collision of a vehicle is absorbed to buckle the pair of first support portions 100. Thus, although the length of the front side member is shortened, there is an advantage that stiffness of a vehicle against the forward collision is maintained and improved. Furthermore, the plurality of beads 180 are vertically formed on the side surfaces 160 of the pair of first support portions 100 and spaced from each other in a longitudinal direction thereof, leading to more buckling of the first support portions 100 at the time of the forward collision of a vehicle. As a result, buckling performance of the pair of first support portions 100 is excellent in absorbing a large amount of impact at the time of the forward collision of a vehicle. The beads 180 of the present pair of the first support portions 100 may be formed in a groove shape curved into the pair of first support portions 100 with a certain length. Accordingly, at the time of the forward collision of a vehicle, the pair of first support portions 100 are buckled while being crushed from a front to rear in a stepwise manner, and thus has an advantage of excellent capacity to absorb the impact.

In an exemplary embodiment of the present invention, as shown in FIG. 5, the front end portions 620 of the pair of fender aprons 600 may have cross-sectional areas wider than cross-sectional areas of rear surface portions 190 of the pair of first support portions 100.

In an exemplary embodiment of the present invention, a panel-shaped plate P may be coupled to the front end portions 620 of the pair of fender aprons 600. Furthermore, the rear surface portions 190 of the pair of first support portions 100 may be coupled to the plate P through a process such as welding. Meanwhile, the plate P may be coupled to the front end portions 620 of the pair of fender aprons 600 by bolting B. Accordingly, the cross-sectional areas of the front end portions 620 of the pair of fender aprons 600 are narrower than the cross-sectional areas of the rear surface portions 190 of the pair of first support portions 100 to thereby secure a working space at the time of coupling the plate P and the front end portions 620 of the pair of fender aprons 600 to each other by bolting B.

Meanwhile, as shown in FIG. 1, FIG. 2, and FIG. 3, in the front support apparatus for a vehicle of the present invention, a pair of second support portions 200 each extending forward of a vehicle may be formed at front end portions of the pair of front side members 700, and a left rear end portion and a right rear end portion of the middle back beam 20 may be connected to each of the front end portions of the pair of second support portions 200. As described above, in consideration of the tendency that a length of the front side member becomes shorter using a vehicle body with a short overhang, there is a possibility that the front side member cannot sufficiently absorb the impact at the time of the forward collision of a vehicle. Accordingly, to solve the problem in an exemplary embodiment of the present invention, the impact of the forward collision may be more absorbed through the pair of second support portions 200 connected to the middle back beam 20.

In detail, each of the pair of second support portions 200 may have an upper surface 220, a lower surface 240, and a pair of side surfaces 260 connecting the upper and lower surfaces 220 and 240 to each other and formed into a hollow closed section structure. A plurality of beads 280 are vertically formed on the side surfaces 260 of the pair of second support portions 200 and spaced from each other in a longitudinal direction thereof. In the pair of second support portions 200 described above form load paths at the time of the forward collision of a vehicle to perform a function of delivering a load applied through the middle back beam 20 to the pair of front side members 700. Furthermore, the pair of second support portions 200 are formed into the hollow closed section structure whereby the impact due to the forward collision of a vehicle is absorbed to buckle the pair of second support portions 200. Thus, although the length of the front side member is shortened, there is an advantage that stiffness of a vehicle against the forward collision is maintained and improved. Furthermore, the plurality of beads 280 are vertically formed on the side surface 260 of the pair of second support portions 200 and spaced from each other in a longitudinal direction thereof, leading to more buckling of the second support portions 200 at the time of the forward collision of a vehicle. As a result, buckling performance of the pair of second support portions 200 is excellent in absorbing a large amount of impact. The beads 280 of the present pair of the second support portions 200 may be formed in a groove shape curved into the pair of second support portions 200 with a certain length. Accordingly, at the time of the forward collision of a vehicle, the pair of first support portions 100 are buckled while being crushed from a front to rear in a stepwise manner, and thus has an advantage of excellent capacity to absorb the impact.

Furthermore, as shown in FIG. 1, FIG. 2, and FIG. 3, in the front support apparatus for a vehicle of the present invention, a pair of third support portions 300 each extending forward of a vehicle may be formed at the front end portion of the front sub-frame 800, and a left rear end portion and a right rear end portion of the lower back beam 30 may be connected to each of the front end portions of the pair of third support portions 300. As described above, in consideration of the tendency that a length of the front side member becomes shorter using a vehicle body with a short overhang, there is a possibility that the front side member cannot sufficiently absorb the impact at the time of the forward collision of a vehicle. Accordingly, to solve the problem, in an exemplary embodiment of the present invention, the impact of the forward collision may be further absorbed through the pair of third support portions 300 connected to the lower back beam 30.

In detail, as shown in FIG. 3 and FIG. 4, the rear end portions of the pair of third support portions 300 may be connected to a point where a front mount 820 connected to a vehicle body in the front end portion of the front sub-frame 800 is formed. Accordingly, since the impact applied through the pair of third support portions 300 is directly delivered to the front mount 820 through the front sub-frame 800, there is an advantage that the load path is formed well.

In more particular, each of the pair of third support portions 300 may have an upper surface 320, a lower surface 340, and a pair of side surfaces 360 connecting the upper and lower surfaces 320 and 340 to each other and formed into a hollow closed section structure; and a plurality of beads 380 are vertically formed on the side surfaces 360 of the pair of third support portions and spaced from each other in a longitudinal direction thereof.

In the pair of third support portions 300 described above form load paths at the time of the forward collision of a vehicle to perform a function of delivering a load applied through the lower back beam 30 to the front sub-frame 800. Furthermore, the pair of third support portions 300 are formed into a hollow closed section structure whereby the impact due to the forward collision of a vehicle is absorbed to buckle the pair of third support portions 300. Thus, although the length of the front side member is shortened, there is an advantage that stiffness of a vehicle against the forward collision is maintained and improved. Furthermore, a plurality of beads 380 are vertically formed on the side surface 360 of the pair of third support portions 300 and spaced from each other in a longitudinal direction thereof, leading to more buckling of the third support portions 300 at the time of the forward collision of a vehicle. As a result, buckling performance of the pair of third support portions 300 is excellent in absorbing a large amount of impact. The beads 380 of the present pair of the third support portions 300 may be formed in a groove shape curved into the pair of third support portions 300 with a certain length. Accordingly, at the time of the forward collision of a vehicle, the pair of first support portions 100 are buckled while being crushed from a front to rear in a stepwise manner, and thus has an advantage of excellent capacity to absorb the impact.

Furthermore, the side surfaces 360 of the pair of third support portions 300 may connect the upper and lower surfaces 320 and 340 to each other at internal end portions 360 of the pair of the third support portions 300 toward an internal to a vehicle, and external end portions 390 of the pair of the third support portions 300 may be formed in an open shape such as "C" shape. In the instant case, since the external end portions 390 of the pair of third support portion 300 are opened, the front end portions of the pair of the third support portions 300 are crushed to an external side of a vehicle and to be bent at the time of the forward collision of a vehicle, and thus has an advantage of increased capacity to absorb the impact.

As described above, in an exemplary embodiment of the present invention, the pair of the first support portions 100, the pair of the second support portions 200, or the pair of the third support portions 300 is provided to form various load paths as shown in FIG. 1, FIG. 2, and FIG. 3. Accordingly, there is an advantage that an amount of impact applied at the time of the forward collision of a vehicle is absorbed efficiently to the vehicle body. Furthermore, since the buckling occurs in the support portion itself when each support portion collides with each other, there is also an advantage that the amount of impact is reduced.

Furthermore, as shown in FIG. 3, the upper back beam 10 and the middle back beam 20 may be mounted in parallel on the same imaginary vertical line with respect to a longitudinal direction of a vehicle.

Furthermore, as shown in FIG. 3, the middle back beam 20 and the lower back beam 30 may be mounted in parallel on the same imaginary vertical line with respect to the longitudinal direction of a vehicle.

Accordingly, each of the back beams is vertically mounted on the same imaginary vertical line with respect to the longitudinal direction of a vehicle, delivering a uniform amount of impact to each of the back beams at the time of the forward collision of a vehicle. Thus, there is an advantage that the amount of impact is uniformly delivered to the vehicle body along each load path.

Furthermore, as shown in FIGS. 1, 2, and 6, the front support apparatus for a vehicle of the present invention may further include a first connection portion 400 extending in a vertical direction of a vehicle and having an upper portion connected to the upper back beam 10 and a lower portion connected to the middle back beam 20. By forming the first connection portion 400 as described above, there is an advantage that the load path is formed between the upper back beam 10 and the middle back beam 20. That is, although a collision occurs in only one of the upper back beam 10 and the middle back beam 20, the impact may be also delivered to the other back beam through the first connection portion 400. Furthermore, when an impact directly occurs in the first connection portion 400 against the forward collision, there is an advantage that the first connection portion 400 is buckled to absorb an amount of impact.

Furthermore, as shown in FIGS. 1, 2, and 7, the front support apparatus for a vehicle of the present invention may further include a second connection portion 500 extending in a vertical direction of a vehicle and having an upper portion connected to the middle back beam 20 and a lower portion connected to the lower back beam 30. By forming the second connection portion 500 as described above, there is an advantage that the load path is formed between the middle back beam 20 and the lower back beam 30. That is, although a collision occurs in any one of the middle back beam 20 and the lower back beam 30, the impact may be delivered to the other back beam through the second connection portion 500. Furthermore, when an impact directly occurs in the second connection portion 500 against the forward collision, there is an advantage that the second connection portion 500 is buckled to absorb an amount of impact.

Furthermore, as shown in FIG. 1, FIG. 2, and FIG. 3, the front support apparatus for a vehicle of the present invention may further include a first connection portion 400 extending in a vertical direction of a vehicle and having an upper portion connected to the upper back beam and a lower portion connected to the middle back beam, and a second connection portion 500 extending in a vertical direction of a vehicle and having an upper portion connected to the middle back beam 20 and a lower portion connected to the lower back beam 30, wherein each of the lower end portion of the first connection portion 400 and the upper end portion of the second connection portion 500 may be connected to a center portion of the middle back beam 20. As described above, each of the lower end portion of the first connection portion 400 and the upper end portion of the second connection portion 500 is connected to a center portion of the middle back beam 20, forming the load path among the three back beams. Therefore, the amount of impact is dispersed well in the three back beams at the time of the forward collision of a vehicle, which is advantageous. For example, although the collision occurs only in the lower back beam 30, the impact may be delivered to the middle back beam 20 through the second connection portion 500 and then delivered to the upper back beam 10 through the first connection portion 400. Therefore, since the amount of impact at the time of the collision of a vehicle is dispersed well, safety of a vehicle against the collision is improved, which is advantageous.

The front support apparatus for a vehicle according to an exemplary embodiment of the present invention is configured for absorbing an external impact through the three back beams mounted at a front of a vehicle.

An engine compartment becomes smaller than that of the conventional vehicle body structure, such that an internal space of a vehicle may be expanded, which is advantageous. Furthermore, although the engine compartment becomes smaller, performance of a vehicle against a forward collision through the three back beams is maintained and improved, which is advantageous.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A front support apparatus for a vehicle, the front support apparatus comprising:
    an upper back beam mounted at a front of the vehicle, extending in a width direction of the vehicle, and connected to front end portions of a pair of fender aprons mounted at the front of the vehicle;
    a middle back beam mounted below the upper back beam, extending in the width direction of the vehicle, and connected to front end portions of a pair of front side members extending to the front of the vehicle;
    a lower back beam mounted below the middle back beam, extending in the width direction of the vehicle, and connected to a front end portion of a front sub-frame mounted below the vehicle; and
    a first connection portion mounted between the upper back beam and the middle back beam, extending in a vertical direction directly from the middle back beam and having an upper portion connected to the upper back beam and a lower portion connected to the middle back beam,
    wherein a pair of first support portions each extending forward of the vehicle is formed at the front end portions of the pair of fender aprons, and a left rear end portion and a right rear end portion of the upper back beam are connected to each of the front end portions of the pair of first support portions, and
    wherein the front end portions of the pair of fender aprons have cross-sectional areas wider than cross-sectional areas of rear surface portions of the pair of first support portions.

2. The front support apparatus for the vehicle of claim 1, wherein each of the pair of first support portions has an upper surface, a lower surface, and a pair of side surfaces connecting the upper and lower surfaces of the pair of first support portions to each other and formed into a hollow closed section structure, and
    wherein a plurality of beads are vertically formed on the side surfaces of the pair of first support portions and spaced from each other in a longitudinal direction of the side surfaces of the pair of first support portions.

3. The front support apparatus for the vehicle of claim 1, further including:
    a plate coupled to the front end portions of the pair of fender aprons,
    wherein rear surface portions of the pair of first support portions are coupled to a predetermined area of the plate, and
    wherein the plate is coupled to the front end portions of the pair of fender aprons by bolting.

4. The front support apparatus for the vehicle of claim 1, wherein a pair of second support portions each extending forward of the vehicle is formed at the front end portions of the pair of front side members, and a left rear end portion and a right rear end portion of the middle back beam are connected to each of front end portions of the pair of second support portions.

5. The front support apparatus for the vehicle of claim 4, wherein each of the pair of second support portions has an upper surface, a lower surface, and a pair of side surfaces connecting the upper and lower surfaces of the pair of second support portions to each other and formed into a hollow closed section structure, and wherein a plurality of beads are vertically formed on the side surfaces of the pair of second support portions and spaced from each other in a longitudinal direction of the side surfaces of the pair of second support portions.

6. The front support apparatus for the vehicle of claim 1, wherein a pair of third support portions each extending forward of the vehicle is formed at the front end portion of the front sub-frame, and wherein a left rear end portion and a right rear end portion of the lower back beam are connected to each of front end portions of the pair of third support portions.

7. The front support apparatus for the vehicle of claim 6, wherein rear end portions of the pair of third support portions are connected to a point where a front mount connected to a vehicle body in the front end portion of the front sub-frame is formed.

8. The front support apparatus for the vehicle of claim 6, wherein each of the pair of third support portions has an upper surface, a lower surface, and a pair of side surfaces connecting the upper and lower surfaces to each other, and wherein a plurality of beads are vertically formed on the side surfaces of the pair of third support portions and spaced from each other in a longitudinal direction of the side surfaces of the pair of third support portions.

9. The front support apparatus for the vehicle of claim 8, wherein the side surfaces of the pair of third support portions connect the upper and lower surfaces of the pair of third support portions to each other at internal end portions of the pair of the third support portions toward an internal to the vehicle, and wherein external end portions of the pair of the third support portions are formed in an open shape.

10. The front support apparatus for the vehicle of claim 9, wherein the open shape is a "C" shape.

11. The front support apparatus for the vehicle of claim 1, wherein the upper back beam and the middle back beam are mounted in parallel on a same imaginary vertical line with respect to a longitudinal direction of the vehicle.

12. The front support apparatus for the vehicle of claim 1, wherein the middle back beam and the lower back beam are mounted in parallel on a same imaginary vertical line with respect to a longitudinal direction of the vehicle.

13. A front support apparatus for a vehicle, the front support apparatus comprising:

an upper back beam mounted at a front of the vehicle, extending in a width direction of the vehicle, and connected to front end portions of a pair of fender aprons mounted at the front of the vehicle;

a middle back beam mounted below the upper back beam, extending in the width direction of the vehicle, and connected to front end portions of a pair of front side members extending to the front of the vehicle;

a lower back beam mounted below the middle back beam, extending in the width direction of the vehicle, and connected to a front portion of a front sub-frame mounted below the vehicle; and a connection portion mounted between the middle back beam and the lower back beam, in a vertical direction of the vehicle and having an upper portion connected to the middle back beam and a lower portion connected to the lower back beam, wherein a pair of first support portions each extending forward of the vehicle is formed at front end portions of the pair of fender aprons, and a left rear end portion and a right rear end portion of the upper back beam are connected to each of front end portions of the pair of first support portions, and wherein the front end portions of the pair of fender aprons have cross-sectional areas wider than cross-sectional areas of rear surface portions of the pair of first support portions.

14. The front support apparatus for the vehicle of claim 1, further including:

a second connection portion mounted between the middle back beam and the lower back beam, extending in the vertical direction of the vehicle and having an upper portion connected to the middle back beam and a lower portion connected to the lower back beam, wherein each of the lower portion of the first connection portion and the upper portion of the second connection portion is connected to a center portion of the middle back beam.

* * * * *